US010128047B2

(12) United States Patent
Gustafson

(10) Patent No.: US 10,128,047 B2
(45) Date of Patent: Nov. 13, 2018

(54) METHODS AND SYSTEMS FOR INCREASING SURFACE AREA OF MULTILAYER CERAMIC CAPACITORS

(71) Applicant: VQ RESEARCH, INC., Palo Alto, CA (US)

(72) Inventor: John L. Gustafson, Santa Clara, CA (US)

(73) Assignee: VQ RESEARCH, INC., Palo Alto, CA (US)

( * ) Notice: Subject to any disclaimer, the term of this patent is extended or adjusted under 35 U.S.C. 154(b) by 87 days.

(21) Appl. No.: 15/212,297

(22) Filed: Jul. 18, 2016

(65) Prior Publication Data

US 2017/0018364 A1    Jan. 19, 2017

Related U.S. Application Data

(60) Provisional application No. 62/194,256, filed on Jul. 19, 2015, provisional application No. 62/211,792, filed on Aug. 30, 2015, provisional application No. 62/232,419, filed on Sep. 24, 2015, provisional application No. 62/266,618, filed on Dec. 13, 2015, provisional application No. 62/279,649, filed on Jan. 15, 2016.

(51) Int. Cl.
| | | |
|---|---|---|
| *H01G 4/30* | (2006.01) | |
| *H01G 4/232* | (2006.01) | |
| *H01G 4/005* | (2006.01) | |
| *H01G 4/012* | (2006.01) | |
| *H01G 4/12* | (2006.01) | |

(52) U.S. Cl.
CPC ............... *H01G 4/30* (2013.01); *H01G 4/005* (2013.01); *H01G 4/012* (2013.01); *H01G 4/232* (2013.01); *H01G 4/1227* (2013.01)

(58) Field of Classification Search
CPC .......... H01G 4/30; H01G 4/005; H01G 4/012; H01G 4/12; H01G 4/228; H01G 4/1227; H01G 4/38
See application file for complete search history.

(56) References Cited

U.S. PATENT DOCUMENTS

| | | |
|---|---|---|
| 2,816,054 A | 12/1957 | Howden |
| 3,115,581 A | 12/1963 | Kilby |
| 3,775,838 A | 12/1973 | Dalmasso |

(Continued)

*Primary Examiner* — Nguyen Ha
(74) *Attorney, Agent, or Firm* — Ricky Lam

(57) ABSTRACT

Methods and systems to improve a multilayer ceramic capacitor using additive manufacturing are disclosed. Layers of a capacitor may be modified from its traditional planar shape to a wavy structure. The wavy shape increases surface area within a fixed volume of the capacitor, thus increasing capacitance, and may comprise smooth and repetitive oscillations without the presence of voltage-degrading sharp corners. In addition, the ends of each conductive layer do not have sharp edges, such as comprising of a round corner. The one-dimensional wave pattern may run parallel to the width of the capacitor, or it may align in parallel to the length of the capacitor. In some embodiments, the wave pattern may be parallel to both the width and the length—in two dimensions—such that it forms an egg-crate shape. Further, the wavy structures may comprise of secondary or tertiary wavy structures to further increase surface area.

4 Claims, 13 Drawing Sheets

(56) References Cited

U.S. PATENT DOCUMENTS

| | | |
|---|---|---|
| 3,864,817 A | 2/1975 | Lapham |
| 5,697,043 A | 12/1997 | Baskaran |
| 5,888,329 A | 3/1999 | Cho |
| 6,141,040 A | 10/2000 | Toh |
| 6,365,480 B1 | 4/2002 | Huppert |
| 6,365,960 B1 | 4/2002 | Pollock |
| 7,199,016 B2 | 4/2007 | Heston |
| 7,495,891 B2 | 2/2009 | Lee |
| 7,667,302 B1 | 2/2010 | Chang |
| 7,766,641 B2 | 8/2010 | Silverbrook |
| 8,054,608 B2 | 11/2011 | Yoon |
| 8,163,077 B2 | 4/2012 | Eron |
| 8,193,532 B2 | 6/2012 | Arai |
| 8,581,381 B2 | 11/2013 | Zhao |
| 2001/0006449 A1* | 7/2001 | Chazono .......... H01G 4/30 361/306.3 |
| 2008/0030922 A1* | 2/2008 | Hidaka .......... H01G 4/232 361/303 |
| 2010/0289128 A1 | 11/2010 | Camacho |
| 2012/0314337 A1* | 12/2012 | Hucker .......... H01G 9/048 361/305 |
| 2012/0327558 A1* | 12/2012 | Jeong .......... H01G 4/008 361/321.4 |
| 2013/0038983 A1* | 2/2013 | Kim .......... H01G 4/30 361/321.1 |
| 2013/0114182 A1 | 5/2013 | Suh |
| 2013/0120899 A1* | 5/2013 | Chung .......... H01G 4/005 361/301.4 |
| 2014/0198427 A1* | 7/2014 | Kamobe .......... H01G 4/30 361/301.4 |
| 2014/0254063 A1* | 9/2014 | Konishi .......... H01G 4/005 361/301.4 |
| 2014/0293501 A1* | 10/2014 | Jeong .......... H01G 4/30 361/301.4 |
| 2015/0136463 A1* | 5/2015 | Lee .......... H01G 4/005 174/260 |

\* cited by examiner

METHODS AND SYSTEMS FOR INCREASING SURFACE AREA OF MULTILAYER CERAMIC CAPACITORS

CLAIMS OF PRIORITY

This patent application is a continuation-in-part and claims priority from:
(1) U.S. provisional patent application No. 62/194,256, titled 'Methods and systems for increasing capacitance of multi-layer ceramic capacitors', filed on Jul. 19, 2015.
(2) U.S. provisional patent application No. 62/211,792, titled 'Methods and systems for geometric optimization of multi-layer ceramic capacitors', filed Aug. 30, 2015.
(3) U.S. provisional patent application No. 62/232,419, titled 'Methods and systems for material cladding of multi-layer ceramic capacitors', filed Sep. 24, 2015.
(4) U.S. provisional patent application No. 62/266,618, titled 'Methods and systems to improve printed electrical components and for integration in circuits", filed Dec. 13, 2015.
(5) U.S. provisional patent application No. 62/279,649, 'Methods and systems to minimize delamination of multi-layer ceramic capacitors", filed Jan. 15, 2016.

FIELD OF TECHNOLOGY

This disclosure relates generally to forming a novel structure of multilayer ceramic capacitors (MLCC) using the technique of drop-on-demand additive printing to deposit droplets of deposition material.

BACKGROUND

Density is a much-sought advantage in electronic components. If specifications can be maintained while reducing the size of a component, devices made from those components can be made using less material (reducing cost and weight) while also reducing bulk. Or, a component can be given enhanced specifications with the same amount of material, if that leads to superior devices. While transistor density has increased dramatically for decades, improvements in "passive" components such as capacitors have not kept pace.

Multilayer ceramic capacitors, or MLCCs, have traditionally been made by forming a tape from insulating ceramic slurry, printing conductive ink layers, and then pressing the layers together and sintering to form a laminated alternation of insulator and conductor. Particularly in the case of a physically large capacitor, there is a possibility of delamination under the stress of temperature or pressure. If a layer separates, even slightly, there is a drop in the capacitance that can render it out of specification, or there can be complete device failure. In addition, the process may be limited to simple flat layers and complex shapes may not be possible.

The goal, therefore, is to find a way to increase both the capacitance and the maximum voltage for a given form factor. As such, there is a need for a technique that is better equipped to optimize geometrical features to increase specifications of an MLCC.

SUMMARY

Disclosed are methods, apparatus, and systems to geometrically optimize multilayer ceramic capacitors (MLCCs). As disclosed herein, the total surface area of the conductors may be increased within a fixed volume.

In one aspect, the present invention discloses a system and a method to improve a ceramic capacitor using additive manufacturing, e.g., 3D Printing, where ink or aerosol jets deposit material such as, e.g., ceramic slurry, conductive ink, ferrite paste, and carbon resistor paste onto a surface. The aforementioned materials can be sintered at high temperatures, and therefore are amenable to integrated manufacture. Compared with traditional methods, this process may be inherently more precise and repeatable, has much higher geometric and spatial resolutions, and produces higher density components with less material waste. In addition, a key advantage for purposes of this invention is that more complex shapes that were not possible before can now be printed, which can be used to improve specification and/or structural integrity of the product.

A typical implementation of an additive manufacturing process begins with defining a three-dimensional geometry of the product using computer-aided design (CAD) software. This CAD data is then processed with software that slices the model into a plurality of thin layers, which are essentially two-dimensional. A physical part is then created by the successive printing of these layers to recreate the desired geometry. This process is repeated until all the layers have been printed. Typically, the resulting part is a "green" part, which may be an unfinished product that can undergo further processing, e.g., sintering. The green part may be dense and substantially non-porous.

Layers of a multilayer ceramic capacitor may be modified from its traditional planar shape to a wave-like structure that is produced by a system or a method of the present invention. The wave shape increases surface area within a fixed volume of the capacitor, thus increasing capacitance, and may comprise smooth and repetitive oscillations without the presence of voltage-degrading sharp corners. In addition, the ends of each conductive layer do not have sharp edges, such as comprising of a round corner. The one-dimensional wave pattern may run parallel to the width of the capacitor, or it may align in parallel to the length of the capacitor. In some aspects, the wave pattern may be parallel to both the width and the length—in two dimensions—such that it forms an egg-crate shape. Further, the wave-like structures may comprise of secondary or tertiary wave-like structures to further increase surface area.

BRIEF DESCRIPTION OF THE DRAWINGS

Example embodiments are illustrated by way of example and are not limited to the figures of the accompanying drawings, in which, like references indicate similar elements.

FIG. 10A illustrates a multilayer ceramic capacitor comprising wave-like structures aligned parallel to both of the capacitor's width and length.

DETAILED DESCRIPTION

Disclosed are methods, apparatus, and systems to geometrically optimize MLCC. Although the present embodiments have been described with reference to specific example embodiments, it will be evident that various modifications and changes may be made to these embodiments without departing from the broader spirit and scope of the various embodiments. In addition, the components shown in the figures, their connections, couples, and relationships, and their functions, are meant to be exemplary only, and are not meant to limit the embodiments described herein.

A capacitor is an electrical device that stores energy in the electric field between a pair of closely spaced conductors. Capacitors may be used as energy-storage devices, and may also be used to differentiate between high-frequency and low-frequency signals. Capacitance value may be defined as a measure of how much charge a capacitor can store at a certain voltage.

Figure 1:
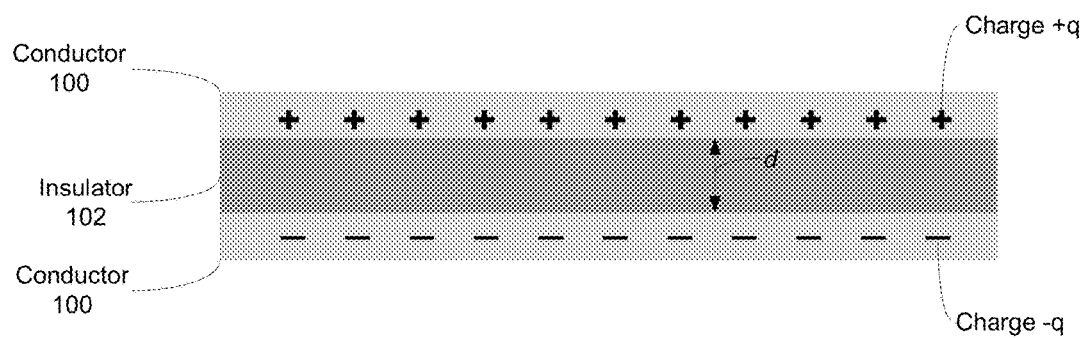
FIG. 1 is a cross-section view of an example plate capacitor.

FIG. 1 is a cross-section view of an example plate capacitor. A capacitor may comprise two conductor 100 (electrodes) separated by insulator 102. The plate capacitor may be manufactured from three parallel plates. If the plates have an area, A, that is separated by a distance d as shown, then the capacitance, C, can be expressed as the formula:

$$C = \frac{K\epsilon_0 A}{d}$$

where K is the ratio of the insulator permittivity to that of a vacuum (sometimes called the dielectric constant of the material), and $\epsilon_0$ is the permittivity of a vacuum. The formula may be inexact due to edge effects: at the border of the parallel plates, the electric field bulges away from the capacitor. If the plate size is large relative to separation 'd', the edge effect is negligible.

Figure 2:
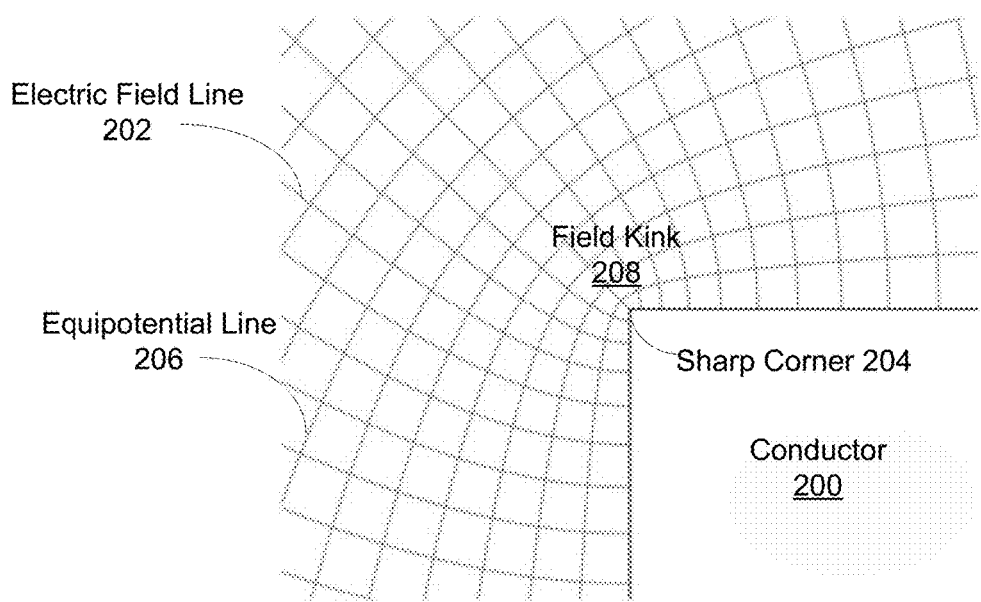
FIG. 2 shows the equipotential lines and electric field lines near a corner of a charged conductor.

FIG. 2 shows the equipotential lines and electric field lines near a corner of a charged conductor. Electric field line 202 may be normal to the surface of conductor 200, which can be of a high intensity near sharp corner 204, resulting in an electric field kink 208. Equipotential line 206 may be parallel to the conductor surface and at a right angle to electric field line 202. Since a capacitor may experience breakdown when the electric field exceeds a certain threshold level, sharp corner 204 may limit the maximum voltage to which the capacitor can be charged. If V is the maximum voltage, then the energy E that a capacitor can hold is given by the formula:

$$E = \frac{1}{2}CV^2$$

Since a use of capacitors is to store energy, anything that can increase the maximum voltage may be desirable since the energy may increase as the square of the voltage; however, exceeding the maximum voltage may cause a miniature lightning strike through the insulator that can render the capacitor inoperable.

A multilayer ceramic capacitor (MLCC) may be a device made of ceramic and metal that alternate to make a multilayer chip. The capacitance value of an MLCC may be determined by several factors, such as geometry of the part, e.g., shape and size, and total active area. The dielectric constant, K, may be determined by the ceramic material. The total active area may be the overlap between two opposing electrodes. A thickness of the dielectric ceramic material may be inversely proportional to the capacitance value such that the thicker the dielectric, the lower the capacitance value. This may also determine the voltage rating, with a thicker dielectric layer comprises a higher voltage rating that a thinner one.

Figure 3:
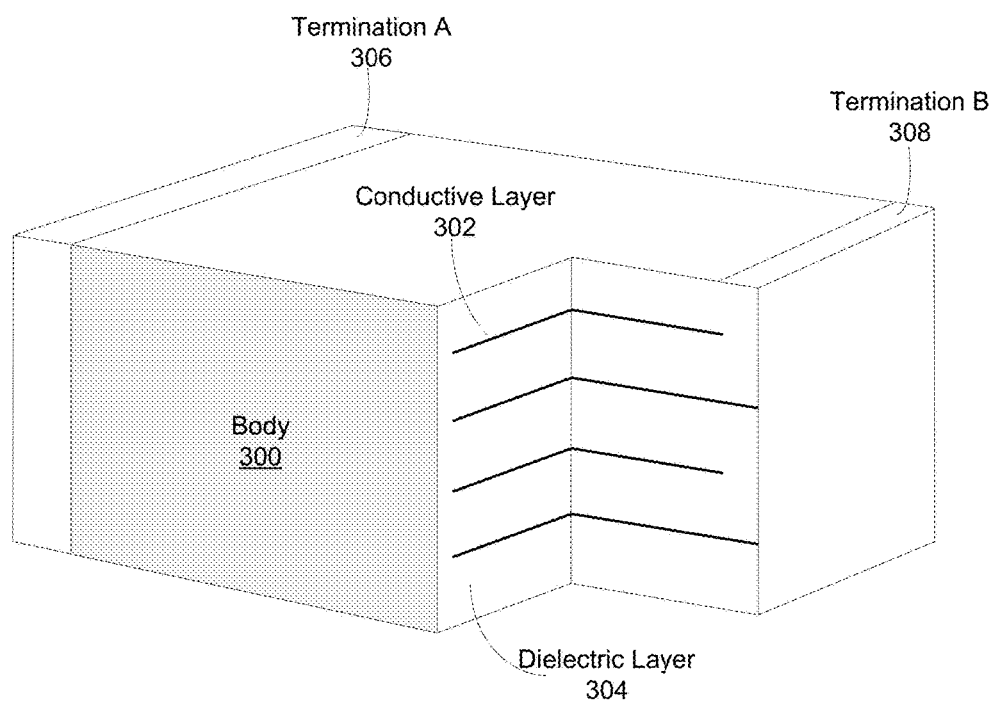
FIG. 3 is a cutaway perspective view of a conventional multilayer ceramic capacitor.

FIG. 3 is a cutaway perspective view of a conventional multilayer ceramic capacitor. The MLCC may comprise a laminated cube-shaped body 300 having alternately stacked conductive layer 302 and ceramic dielectric layer 304, and a pair of external termination A 306 and termination B 308 positioned at two opposite end portions of the body 300. The conductive layer 302 may be made from a noble metal and/or a base metal, e.g., copper, and nickel, silver, palladium, gold, and platinum. The dielectric layer 304 may be made from ceramic material comprising barium titanate.

A plurality of conductive layer 302 may be alternately connected to termination A 306 and termination B 308, such that termination A 306 is connected to every second conductive layer 302, and termination B 308 is connected with the remaining conductive layer 302 not connected to termination A 306. Conductive layer 302 and dielectric layer 304 may have flat surfaces, and the thickness of conductive layer 302 may be spatially uniform, e.g., same height. When a voltage is applied to termination A 306 and termination B 308, the MLCC may produce electric fields between every two neighboring conductive layer 302 and store electric charges therein.

Figure 4:
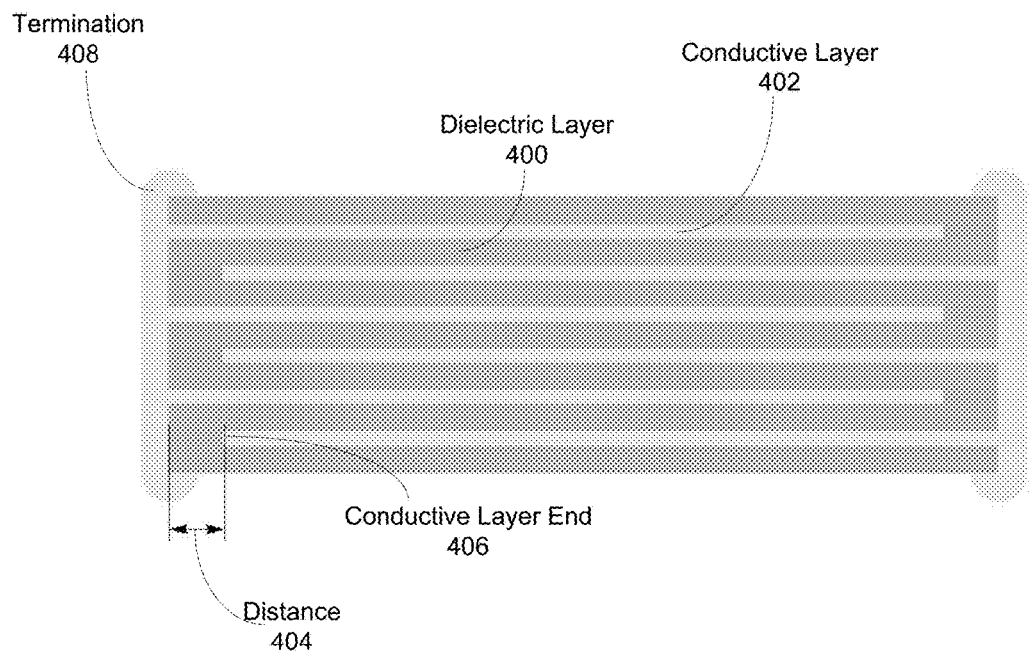
FIG. 4 is a schematic representation of a front cross-section view of a conventional multilayer ceramic capacitor

FIG. 4 is a schematic representation of a front cross-section view of a conventional multilayer ceramic capacitor. Dielectric layer 400 and conductive layer 402 may be several microns thick, and distance 404 between a non-connecting conductive layer end 406 and a corresponding surface of termination 408 that is coupled to the capacitor's body may b e no less than 500 microns due to the imprecise nature of prior art manufacturing processes.

Multilayer ceramic capacitors have traditionally been made by forming a tape from insulating ceramic slurry, printing conductive ink layers, pressing the layers together, and then sintering to form a laminated alternation of insulator and conductor. However, particularly in the case of a physically large MLCC, there is a possibility of delamination under the stress of temperature or pressure. If a layer separates, even slightly, there is a drop in the capacitance that can render it out of specification, or there can be complete device failure. In addition, the process may be limited to simple flat layers and complex shapes may not be possible, such as to avoid sharp corners that can cause voltage breakdown.

In at least one embodiment, the present invention discloses a system and a method to improve a ceramic capacitor using additive manufacturing, e.g., 3D Printing, where ink or aerosol jets deposit material such as, e.g., ceramic slurry, conductive ink, ferrite paste, and carbon resistor paste onto a surface. The aforementioned materials can be sintered at high temperatures, and therefore are amenable to integrated manufacture. Compared with traditional methods, this process may be inherently more precise and repeatable, has much higher geometric and spatial resolutions, and produces higher density components with less material waste. In addition, a key advantage for purposes of this invention is that more complex shapes that were not possible before can now be printed, which can be used to improve specification and/or structural integrity of the product.

Figure 5:
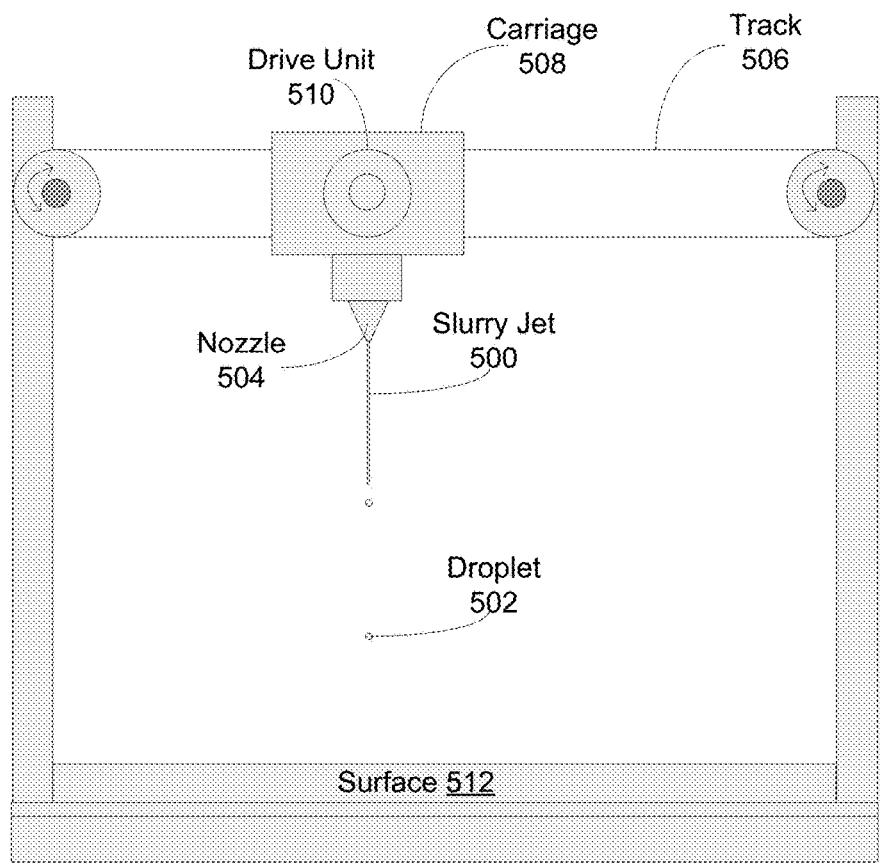
FIG. 5 is a system of a drop-on-demand type additive printer that may be used to implement one or more embodiments of the present invention.

FIG. 5 is a system of a drop-on-demand type additive printer that may be used to implement one or more embodiments of the present invention. A slurry jet 500 may be dispensed from a nozzle 504 having an orifice comprising an opening, and may be raster or vector scanned on track 506 by a carriage 508 driven by drive unit 510 over a surface 512 or on top of an already formed powder bed to define a new layer. Pressure may be used to force the slurry out of the nozzle and into a continuous stream of slurry jet 500 and/or as droplet 502, which may be defined as a breakup of the flow. A layer surface height measurement unit, such as, e.g., a laser rangefinder may be used to receive an input signal to control the height of the surface that is formed by varying the delivery of slurry.

A typical implementation of an additive manufacturing process begins with defining a three-dimensional geometry of the product using computer-aided design (CAD) software. This CAD data is then processed with software that slices the model into a plurality of thin layers, which are essentially two-dimensional. A physical part is then created by the successive printing of these layers to recreate the desired geometry. This process is repeated until all the layers have been printed. Typically, the resulting part is a "green" part, which may be an unfinished product that can undergo further processing, e.g., sintering. The green part may be dense and substantially non-porous.

Figure 6:
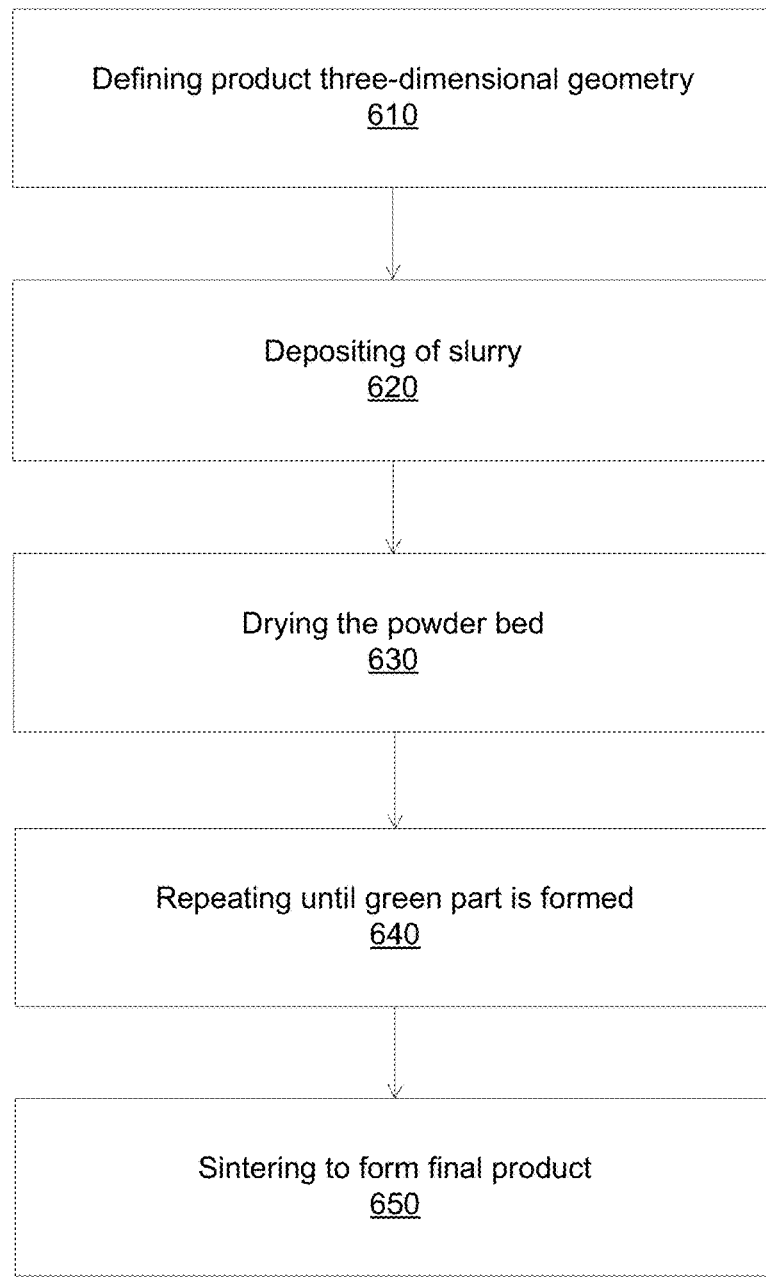
FIG. 6 is a flow diagram of a method of an additive printing process that may be implemented with one or more embodiments of the present invention.

FIG. 6 is a flow diagram of a method of an additive printing process that may be implemented with one or more embodiments of the present invention. Operation 610 defines a final product's three-dimensional geometry using CAD software. In operation 620 deposits layers of slurry comprising powder material and binder onto a surface or on top of a powder bed, which then slip-casts to make a new layer. As the slurry deposits in each two dimensional layer, the printer may select insulator or conductor as the material type, in separate passes or as a combined pass. The slurry may be deposited in any suitable manner, including depositing in separate, distinct lines, e.g., by raster or vector scanning, by a plurality of simultaneous jets that coalesce before the liquid slip-casts into the bed, or by individual drops. The deposit of slurry drops may be individually controlled, thereby generating a regular surface for each layer. Operation 630 dries any liquid from the powder bed, e.g., infrared flash-dry, after deposition of each layer. Operation 640 repeats operations 610 to 640 until a green part is formed. Operation 650 sinters the green part to form a final product. Sintering is a solid-state diffusion process that may be enhanced by increasing the surface area to volume ratio of the powder in any green part that is subsequently sintered.

Figure 7A:
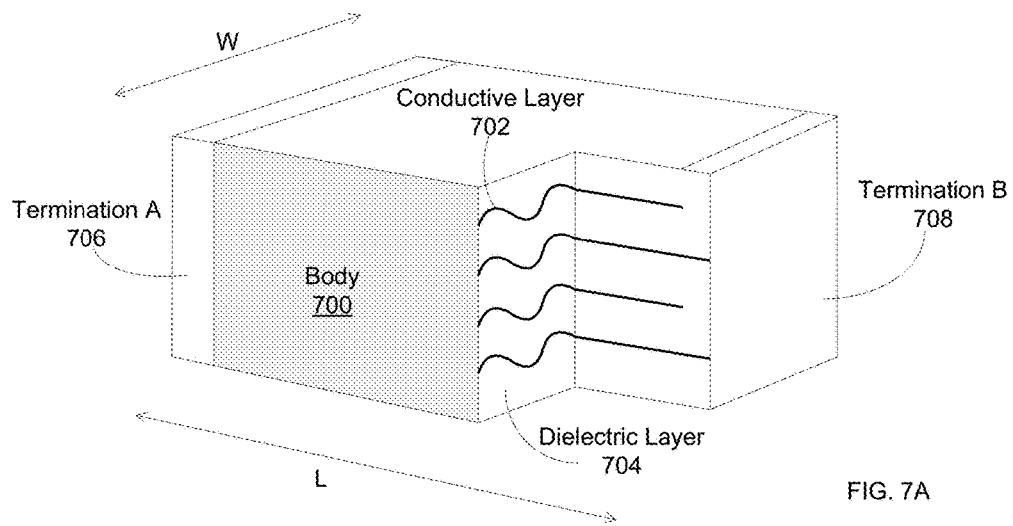
FIGS. 7A-B show cutaway perspective views of a multilayer ceramic capacitor in accordance with an embodiment of the present invention.
Figure 7B:
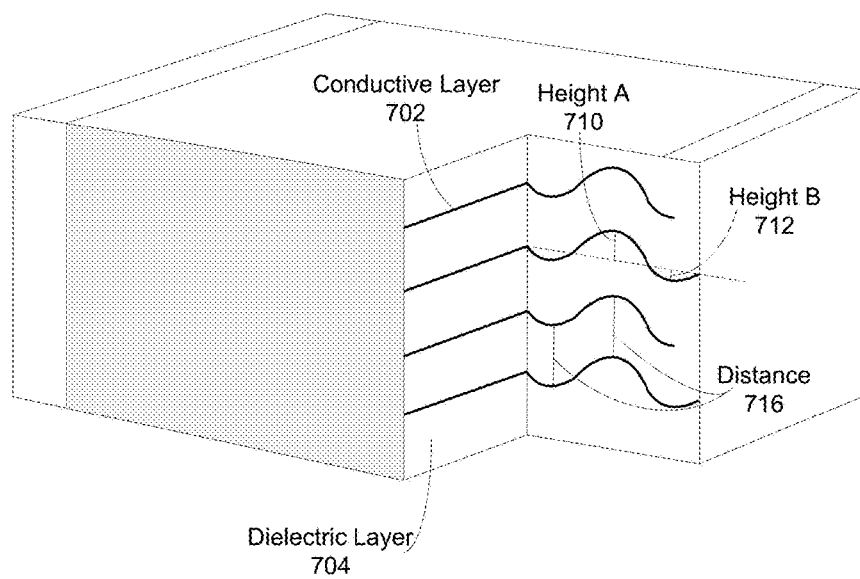

FIGS. 7A-B show cutaway perspective views of a multilayer ceramic capacitor in accordance with an embodiment of the present invention. In FIG. 7A, a multilayer ceramic capacitor (MLCC) may include a laminated body 700 comprising alternately stacked conductive layer 702 and dielectric layer 704, and a pair of external termination A 706 and termination B 708 positioned at two opposite end portions of the body 700. The conductive layer 702 may be made from a noble metal and/or a base metal, e.g., copper, and nickel, silver, palladium, gold, and platinum. The dielectric layer 704 may be made from ceramic material comprising barium titanate. The thickness of the conductive layer 702 and/or the thickness of the dielectric layer 704 may be spatially uniform or they may vary within each layer and/or among the plurality of layers.

A plurality of conductive layer 702 may be alternately connected to termination A 706 and termination B 708, such that termination A 706 is connected to every second conductive layer 702, and termination B 708 is connected with the remaining conductive layer 702 not connected to termination A 706. When a voltage is applied to termination A 706 and termination B 708, the MLCC may produce electric fields between every two neighboring conductive layer 302 and store electric charges therein.

Conductive layer 702 may be modified from its traditional planar shape to a wave-like structure that is produced by a system or a method of the present invention. The wave shape increases surface area within a fixed volume of the capacitor, thus increasing capacitance, and may comprise smooth and repetitive oscillations without the presence of voltage-degrading sharp corners. In addition, the ends of each conductive layer 702 do not have sharp edges, such as comprising of a round corner. The one-dimensional wave pattern may run parallel to the width of the capacitor as in FIG. 7A, or it may align in parallel to the length of the capacitor as in FIG. 7B. In some embodiments, the wave pattern may be parallel to both the width and the length—in two dimensions—such that it forms an egg-crate shape. Further, the wave-like structures may comprise of secondary or tertiary wave-like structures to further increase surface area. Unlike the primary wave-like structures seen in the figures, the secondary or tertiary structures may not vertically align, and may comprise of varying and non-uniform undulations. In some embodiments, the secondary and tertiary wave structures may vertically align and comprise of uniform and non-varying undulations, similar to the primary structures.

FIG. 7B shows wavy shape of conductive layer 702 aligned in parallel to the length of the capacitor body, according to at least one embodiment. Height A 710 of a wave's crest and height B 712 of another crest of the same wave-like structure may be uniform, or they may vary as seen in the figure. For example, height A 710 may be twice the distance or more of height B 712, but their spacing, and thus distance 716 may be unvarying. Although height A 710 and height B 712 may vary, the distance 716 between a pair of juxtapose conductive layer 702, and thus the thickness of the dielectric layer 704, may remain constant throughout the dielectric layer 704. In addition, the thickness of the conductive layer 702 may be kept constant, but may also vary if desired. In some embodiments, the thickness of conductive layer 702 and/or dielectric layer 704 may vary among different respective conductive layer 702 or dielectric layer 704 of a capacitor, e.g., the thickness of each neighboring conductive layer 702 or dielectric layer 704 may alternate from a low thickness and a high thickness.

In some embodiments, the wavy shape of conductive layer 702 may be oriented in a diagonal direction, such as emanating from one corner of the body 700 flowing towards its opposite corner. The wave shape in the diagonal direction may traverse the width or the length of the body 700, and made possible by the method and system of the present invention.

Figure 8A:
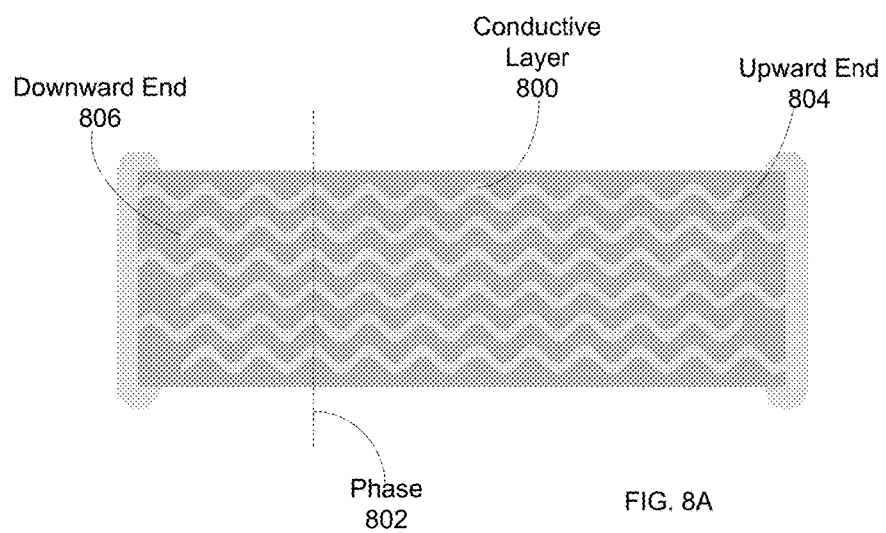
FIG. 8A is a front cross-section of a multilayer ceramic capacitor modified into a wavy shape.

FIG. 8A is a front cross-section of a multilayer ceramic capacitor modified into a wavy shape, according to at least one embodiment. The capacitor shown in the figure may be stacked since the interfaces are the same sinusoidal pattern. In other words, the sinusoidal shape may comprise waves aligned in a same phase 802 in the vertical direction, for example, such that a lower wave's crest is positioned directly below an upper wave's crest, and a lower wave's trough is positioned directly below an upper wave's trough, as depicted in the figure. Aligned waves maintain a narrow range of separation between the two conductive layer 800, allowing higher voltages before there is dielectric breakdown. On the contrary, unaligned waves have varying distances between electrodes and may reduce maximum voltage; however, the invention is not so limited, and unaligned waves may be produced from the system and method of the present invention if there is ever a desire to do so. The thickness measured in the vertical direction may be the same number of 3D volume elements, or voxels, so the volume, weight, and material cost can be identical. In some embodiments, the non-connecting end of each conductive layer 800 may comprise of a round shape to eliminate voltage degrading sharp corners. In addition, the non-connecting ends of each conductive layer may be configured to point upward, such as shown in upward end 804, or it may point downward, such as shown in downward end 806. Each end portion of the capacitor may comprise of upward end 804 and downward end 806 that is configured to alternate such that every second (or third and so on) conductive layer 800 end points upward with the remaining conductive layer 800 end conductive layer 702 points downward, or vice versa.

Figure 8B:
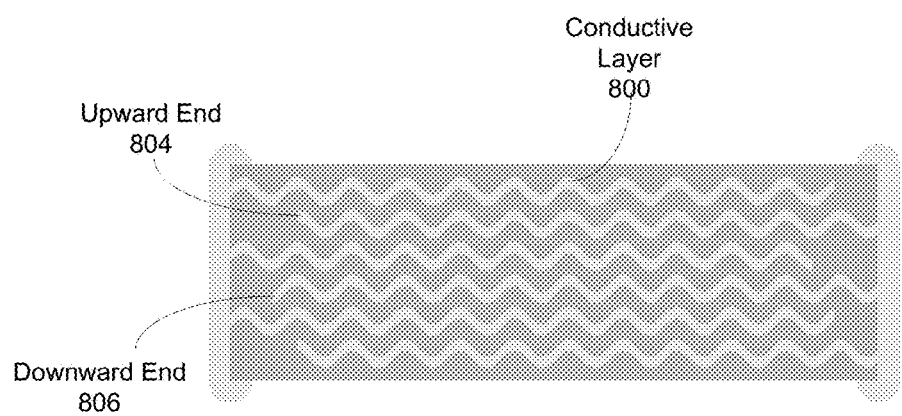
FIG. 8B shows alternating upward end and downward end of non-connecting conductive layers of an MLCC.

FIG. 8B shows alternating upward end and downward end of non-connecting conductive layers of an MLCC, according to at least one embodiment. In addition to the alternation between upward end 804 and downward end 806 of a plurality of conductive layer 800, the lengths of the plurality of conductive layer 800 may also alternate between a full length and a length that is less the half of a wave, as seen in the figure. The precision of the system and method of the present invention allows for this type of structural configuration, which may be advantageous for controlling and adjusting the specifications of the capacitor.

Figure 9:
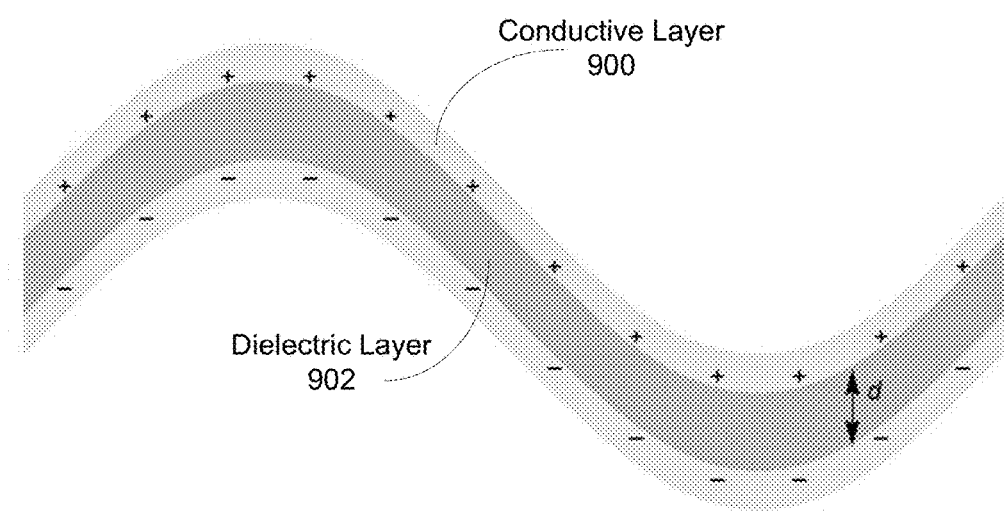
FIG. 9 is a schematic representation of a plate capacitor modified into a wave-like shape, according to at least one embodiment.

FIG. 9 is a schematic representation of a plate capacitor modified into a wave-like shape, according to at least one embodiment. The plate capacitor (or 3-layer MLCC) may be bent into a sinusoid where the vertical depth of both conductive layer 900 and dielectric layer 902 is preserved. The thickness of conductive layer 900 and/or dielectric layer 902 may be constant throughout each layer, or they may vary—if desired. Generally, a steep curve angle of the wave may not be favorable for high voltages without dielectric breakdown. The area may be increased by about 21.6% for the particular wave shape in the figure, which may be the optimal shape considering electric breakdown at wider angles. The capacitance may be increased without an increase in volume, weight, or cost of materials, compared to a comparable MLCC with the traditional non-wavy cross-section. The formula may be given as:

$$C = \frac{\kappa \epsilon_0 A}{d}$$

However, the separation of the two conductors in the direction normal to the conductors may be less than or equal to the 'd' value for parallel flat plates. The insulator may be pinched to about 0.7d—or $(2\sqrt{}/2)d$—at the points of maximum upward and downward slope. This may further increase the capacitance value C, since capacitance grow inversely with separation distance.

FIG. 10A illustrates a multilayer ceramic capacitor comprising wave-like structures aligned parallel to both of the capacitor's width and length. The two-dimensional waves of two or more conductive layer 1000 may be aligned such that a lower wave's crest is positioned directly below an upper wave's crest, and a lower wave's trough is positioned directly below an upper wave's trough. The thickness of conductive layer 1000 and/or dielectric layer 1002 may be constant throughout each layer, or they may vary-if desired. In some embodiments, the thickness of conductive layer 1000 and/or dielectric layer 1002 may vary among different respective conductive layer 1000 or dielectric layer 1002 of a capacitor, e.g., the thickness of each neighboring conductive layer 1000 or dielectric layer 1002 may alternate from a low thickness and a high thickness.

Figure 10B:
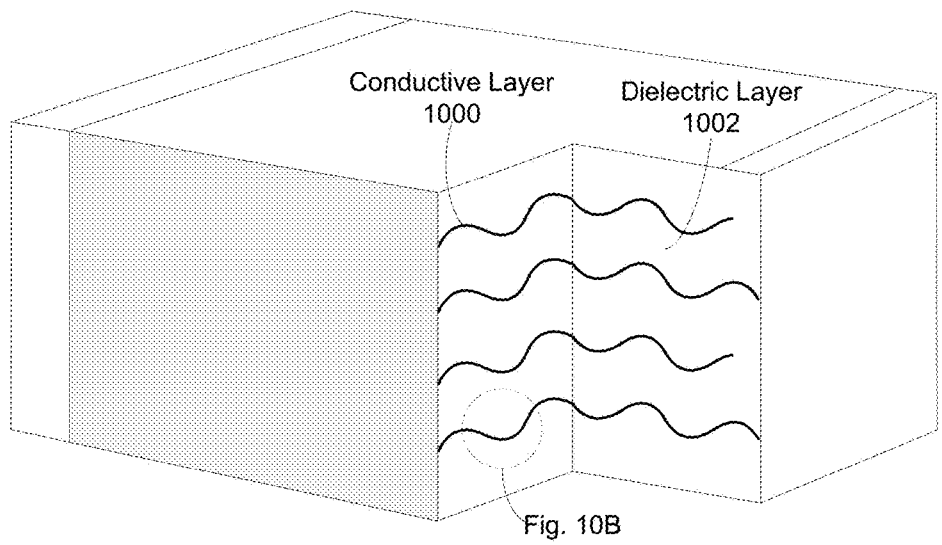
FIG. 10B shows secondary wave-like structures that can further increase surface area of conductive layer.
Figure 10B:
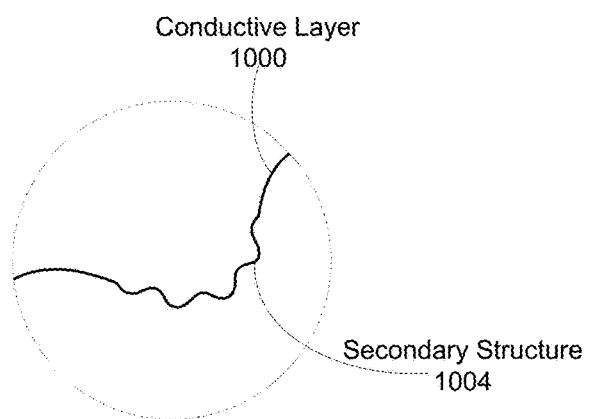

FIG. 10B shows secondary wave-like structures that can further increase surface area of conductive layer 1000, thus increasing capacitance of the capacitor. Secondary structure 1004 may be aligned parallel with the length and/or width of the capacitor's body, and may align in a vertical phase with secondary structure 1004 of juxtapose conductive layer 1000. In addition, the method and system of the present invention can be so precise as to having the ability to print tertiary structures, which further increases surface area, on the secondary structure 1004 (not shown). Further, the secondary or tertiary structures may be disposed throughout each conductive layer 1000, or they may be unevenly distributed such that one or more portions of the conductive layer 1000 include secondary or tertiary structures while one or more portions of the conductive layer 1000 does not include secondary or tertiary structures, and can allow for adjustments to the specification of the capacitor. For example, ½ or ⅓ of conductive layer 1000 may comprise secondary or tertiary structures.

Figure 11:
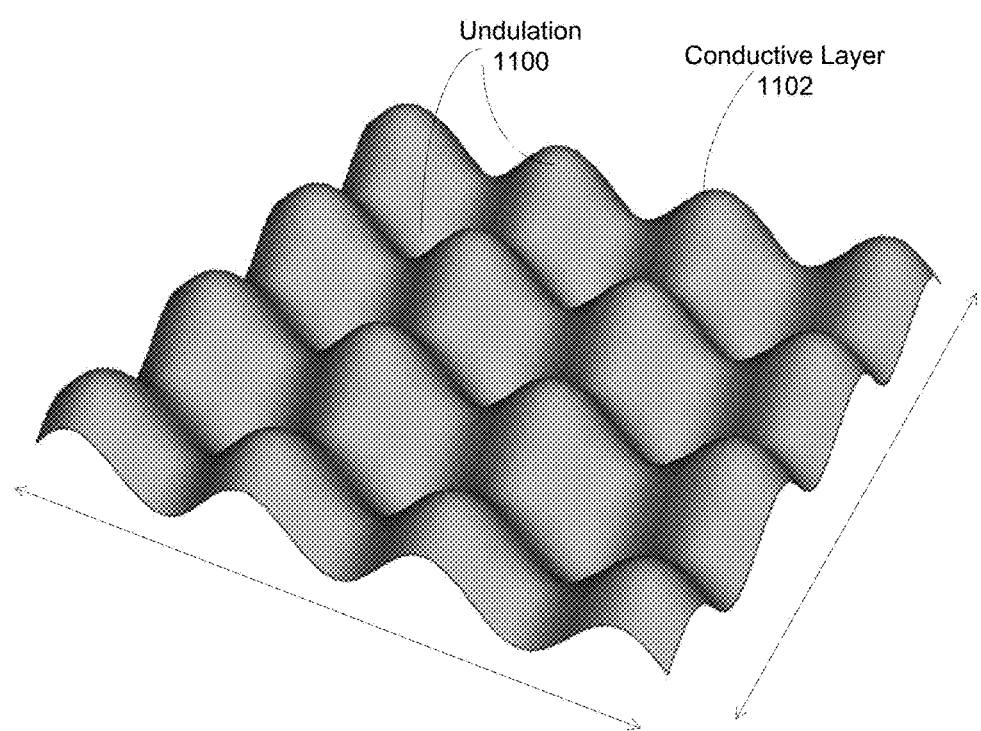
FIG. 11 is a perspective view of a conductive layer comprising an egg-crate shape, according to at least one embodiment.

FIG. 11 is a perspective view of a conductive layer comprising an egg-crate shape, according to at least one embodiment. Surface area may be increased through a plurality of undulation 1100 in two dimensions without changing the amounts of conductor or insulator material. The egg crate surface may be smooth with no surface irregularities or rough, such as comprising upwards and/or downward bumps to further maximize surface area, e.g., second degree or third degree undulations. The egg crate surface may comprise a pattern of elevations and depressions that may be evenly spaced and sized, e.g., comprising a same height and/or same base surface area. In other embodiments, the egg crate surface not may be evenly spaced, such as comprising an irregular pattern or a repeating pattern of spacing distances and varying elevation and depression heights. In some embodiments, the conductive layer 1102 may be stacked perfectly without gaps, and alternating with dielectric layers, to form an MLCC.

In some embodiments, the wavy shape of conductive layer 1000 may be oriented in diagonal directions, such as emanating from one corner of the capacitor flowing towards its opposite corner. The wave shape in the diagonal directions may traverse the width and the length of the capacitor, such that the undulations are angled (1 degree to 90 degrees), and made possible by the method and system of the present invention.

Figure 12:
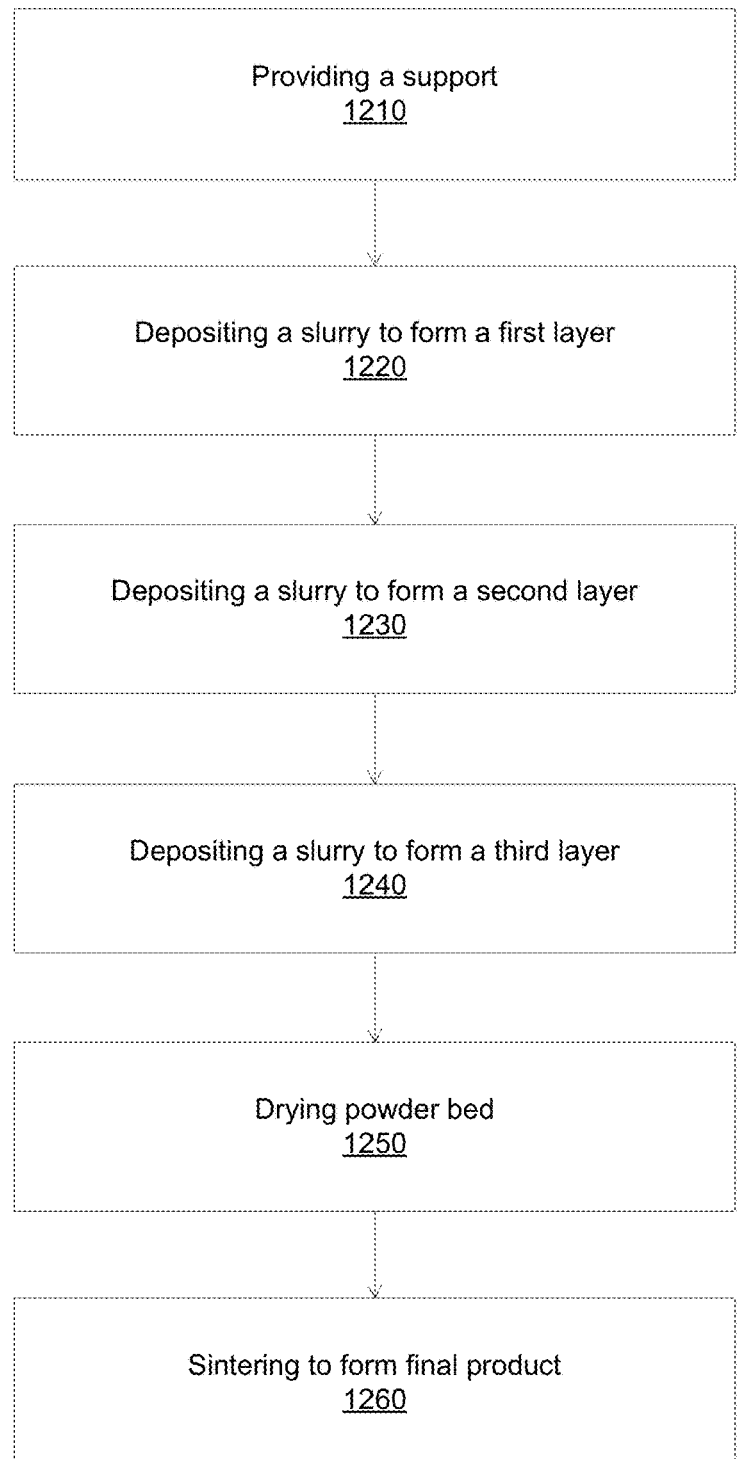
FIG. 12 is a flow diagram of a method of additive manufacturing that may be implemented in one or more embodiments of the present invention.

FIG. 12 is a flow diagram of a method of additive manufacturing that may be implemented in one or more embodiments of the present invention. Operation 1210 provides a support over a selected area. Operation 1220 deposits liquid slurry that contains a slurry to form a first layer comprising conductive metal, such as, e.g., copper, and nickel, silver, palladium, gold, and platinum. The slurry may be deposited as continuous parallel streams, or as individually controlled droplets, thereby generating a regular surface for each layer. Operation 1230 deposits liquid slurry to form a second layer comprising dielectric or ceramic material comprising barium titanate. Operation 1240 deposits liquid slurry to form a third layer. The third layer may comprise of the same material as the first layer. The layers of the capacitor may comprise of a wavy shape or egg crate shape. In some embodiments, operation 1220 and operation 1230 sequentially repeat until a predetermined amount of alternating layers of conductor and dielectric material is achieved. Operation 1250 dries the powder bed by flash drying, e.g., infrared heating.

Figure 13:
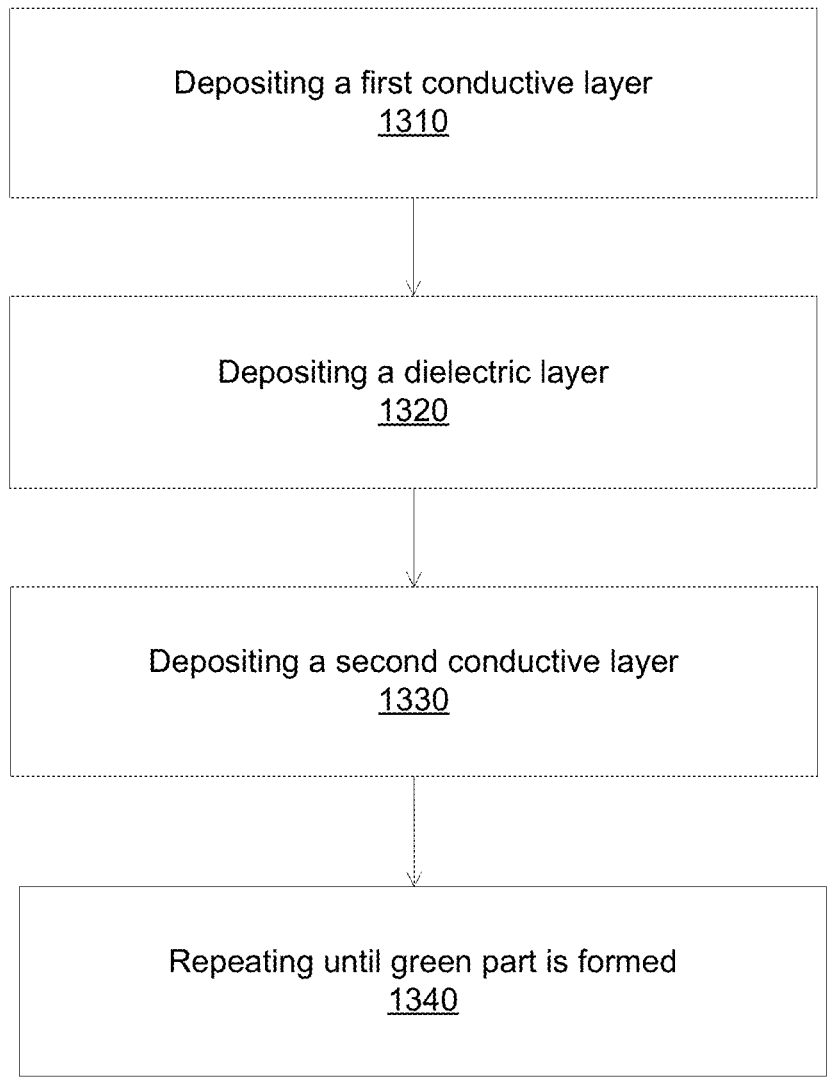
FIG. 13 is a flow diagram of another method of additive manufacturing that may be implemented in one or more embodiments of the present invention.

FIG. 13 is a flow diagram of another method of additive manufacturing that may be implemented in one or more embodiments of the present invention. Operation 1310 deposits a first conductive layer onto a surface. Operation 1320 deposits a dielectric layer on a top surface of the first conductive layer. Operation 1330 deposits a second conductive layer onto a top surface of the dielectric layer. Optionally, operation 1340 repeats operation 1320 and operation 1330 successively and sequentially such that the conductive layers and the dielectric layers alternate, and the conductive layers are disposed at both the bottom layer and the top layer, although in practice, MLCCs are manufactured with dielectric layers disposed at both the bottom layer and the top layer. The steps aforementioned may produce a ceramic capacitor comprising a first conductive layer formed on a surface of a dielectric layer, and a second conductive layer formed on an opposing surface of the dielectric layer. The layers of the capacitor may comprise of a wavy shape or egg crate shape.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims. It may be appreciated that the various systems, methods, and apparatus disclosed herein may be embodied in a machine-readable medium and/or a machine accessible medium, and/or may be performed in any order. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A multilayer ceramic capacitor, comprising:
   a ceramic body;
   one or more dielectric layers alternately stacked with two or more conductive layers,
   wherein at least one conductive layer is configured to be structurally sinusoidal,
   wherein the structurally sinusoidal conductive layers are aligned in a same vertical phase when two or more conductive layers are structurally sinusoidal;
   a pair of external termination disposed at opposite end portions of the body,
   wherein the two or more conductive layers are alternately coupled to an external termination of the pair of external termination, and
   wherein the structurally sinusoidal conductive layer comprises a secondary sinusoidal structure.

2. The multilayer ceramic capacitor of claim 1, further comprising:
   wherein the structurally sinusoidal conductive layer comprising the secondary sinusoidal structure comprises of a tertiary sinusoidal structure.

3. A multilayer ceramic capacitor, comprising:
   a ceramic body;
   one or more dielectric layers alternately stacked with two or more conductive layers,
   wherein at least one conductive layer is configured to be structurally sinusoidal,
   wherein the structurally sinusoidal conductive layers are aligned in a same vertical phase when two or more conductive layers are structurally sinusoidal;
   a pair of external termination disposed at opposite end portions of the body,
   wherein the two or more conductive layers are alternately coupled to an external termination of the pair of external termination, and
   wherein a non-coupled end of each structurally sinusoidal conductive layer comprises a round corner.

4. A multilayer ceramic capacitor, comprising:
   a ceramic body;
   one or more dielectric layers alternately stacked with two or more conductive layers,
   wherein at least one conductive layer is configured to be structurally sinusoidal,
   wherein the structurally sinusoidal conductive layers are aligned in a same vertical phase when two or more conductive layers are structurally sinusoidal;
   a pair of external termination disposed at opposite end portions of the body,
   wherein the two or more conductive layers are alternately coupled to an external termination of the pair of external termination, and
   wherein the sinusoidal structure of the conductive layer runs parallel to two dimensions of the multilayer ceramic capacitor to form an egg-crate shape.

* * * * *